United States Patent [19]
Hush

[11] Patent Number: 5,610,667
[45] Date of Patent: Mar. 11, 1997

[54] APPARATUS AND METHOD FOR MAINTAINING SYNCHRONISM BETWEEN A PICTURE SIGNAL AND A MATRIX SCANNED ARRAY

[75] Inventor: Glen E. Hush, Boise, Id.

[73] Assignee: Micron Display Technology, Inc., Boise, Id.

[21] Appl. No.: 519,139

[22] Filed: Aug. 24, 1995

[51] Int. Cl.⁶ .............................. H04N 5/66; H04N 5/10
[52] U.S. Cl. ..................... 348/796; 348/540; 348/531; 345/205; 345/74
[58] Field of Search ..................... 348/790–793, 348/796, 800–803, 797, 798, 525, 529, 530, 531, 536, 537, 540, 541, 542, 545; 345/55, 74, 204, 205, 206, 213, 75; 315/169.1–169.4; H04N 9/12, 5/70, 3/12, 5/66, 5/10

[56] References Cited

U.S. PATENT DOCUMENTS

| | | | |
|---|---|---|---|
| 4,238,770 | 12/1980 | Kobayashi et al. | 358/154 |
| 4,511,926 | 4/1985 | Crossland et al. | 348/792 |
| 4,616,259 | 10/1986 | Moran et al. | 348/521 |
| 4,748,510 | 5/1988 | Umezawa | 348/792 |
| 5,129,850 | 7/1992 | Kane et al. | 445/24 |
| 5,132,794 | 7/1992 | Okada et al. | 348/531 |
| 5,153,574 | 10/1992 | Kondo | 340/784 |
| 5,189,515 | 2/1993 | Chen | 358/157 |
| 5,212,426 | 5/1993 | Kane | 315/169.1 |
| 5,245,431 | 9/1993 | Okada et al. | 348/531 |
| 5,303,046 | 4/1994 | Masuda | 348/500 |
| 5,359,256 | 10/1994 | Gray | 313/169 |

Primary Examiner—Micheal H. Lee
Attorney, Agent, or Firm—Seed and Berry LLP

[57] ABSTRACT

A display apparatus for receiving a picture signal having video and synchronizing components includes a matrix of display cells arranged in an array of M columns by N rows. Display cells in the matrix are individually addressable by row and column signals so as to receive the video component of the picture signal in response thereto. A first shift circuit coupled to the matrix provides the column signals in response to a first clocking signal. A second shift circuit coupled to the matrix provides the row signals in response to a second clocking signal. A synchronizing detector or gate circuit coupled to the first and second shift circuits receives the synchronizing component of the picture signal and produces the second clocking signal in response to a preselected pointer signal from the first shift circuit. A phase locked loop circuit coupled to the first shift circuit receives the second clocking signal and produces the first clocking signal in response thereto.

26 Claims, 5 Drawing Sheets

APPARATUS AND METHOD FOR MAINTAINING SYNCHRONISM BETWEEN A PICTURE SIGNAL AND A MATRIX SCANNED ARRAY

This invention was made with Government support under Contract No. DADT63-93-C-0025 ordered by Advanced Research Projects Agency (ARPA). The Government has certain rights in this invention.

TECHNICAL FIELD

This invention relates to visual display systems, and more particularly to systems for maintaining synchronization between picture signals and visual display devices.

BACKGROUND OF THE INVENTION

Current visual display devices such as televisions typically employ cathode ray tubes ("CRTs"). Most televisions are driven by an analog video signal, which in North America, is governed by the NTSC standard. The standard NTSC signal, and other standard television signals, include both video and synchronizing ("sync") signals. In a color television signal, the video signals include luminance (e.g., intensity) and chrominance (e.g., color) information. The sync signal includes horizontal and vertical synching pulses, and horizontal and vertical blanking intervals. The horizontal synching pulses synchronize the horizontal sweep of the CRT's scanning electron gun with the source that produced the NTSC signal. Similarly, the vertical synching pulses synchronize fields or frames of displayed information on the CRT.

The horizontal blanking interval is a period that compensates for the time required for the electron gun to return from the right-hand side back to the left-hand side of the screen between the display of adjacent lines on the CRT. Likewise, the vertical blanking interval is a period that compensates for the time required for the electron gun to return from the bottom to the top of the screen between the display of consecutive frames. Well-known circuitry coupled to the CRT synchronizes and drives the electron gun in response to the video and synchronizing signals of the television signal to produce a coherent picture.

CRTs, however, are bulky, heavy, and consume significant amounts of power. Therefore, alternative displays have been developed such as liquid crystal displays ("LCDs") and electroluminescent displays. Such displays are typically referred to as "matrix displays" because they include an M row by N column matrix of display cells or "pixels".

In active matrix displays, such as LCDs, each display cell includes at least one switch, driven by a pointer signal, that enables the video signal to drive the display cell in the LCD. LCDs, for example, can employ one million pixels arranged in one thousand rows by one thousand columns. Therefore, many thousands of pointer signals are required to address each display cell in such an LCD.

Unfortunately, LCDs require thousands of interconnections between the display cells and external circuitry that provide the pointer signals. Since LCDs typically cannot be manufactured using standard integrated circuit packaging techniques, such displays are expensive to manufacture due to the thousands of interconnections required. While the manufacture of LCDs has recently become more economical, such displays are, however, still slow and dim compared to CRTs. Electroluminescent displays are quicker and brighter than LCDs, but are considerably more expensive to manufacture.

As noted above, individual display cells in the matrix are individually addressed by means of pointer signals. Typically, a given row is first addressed by a row pointer signal, and then each column is serially addressed by column pointer signals as luminance and chrominance data is provided to each display cell in the row. Such row and column addressing of display cells in the matrix display is similar to the addressing of memory cells in a semiconductor memory device. Therefore, typical computer generated signals are readily adapted for addressing and providing video signals to matrix displays. Matrix displays, however, cannot readily receive television signals such as standard NTSC television signals. Auxiliary circuitry is required to convert the horizontal and vertical synching pulses into clocking and addressing signals for addressing and writing data to each display cell in the matrix array.

If LCDs could be efficiently manufactured using standard integrated circuit manufacturing techniques, then it would be economical to monolithically integrate the LCD onto a single substrate with the auxiliary circuitry or synchronizing and clocking circuitry necessary for converting an NTSC signal into a signal appropriate for addressing the LCD. In addition to the difficulty in manufacturing LCDs under standard integrated circuit manufacturing techniques, however, conventional synchronization and clocking circuitry requires considerable area on a semiconductor substrate and consumes excessive power. Therefore, if manufacturing techniques improve, such circuitry could not likely be integrated with an LCD or other matrix displays on a single substrate. In addition to consuming significant area on a semiconductor substrate, typical synchronizing and clocking circuitry employed by televisions is complex. Therefore, such synchronizing and clocking circuitry would increase the complexity, and therefore the cost, of the LCD or other matrix display.

SUMMARY OF THE INVENTION

The present invention allows circuitry required to operate a matrix display to also provide synchronizing and clocking functions. As a result, such circuitry, currently monolithically integrated with a certain matrix display, can be employed to perform clocking and synchronizing functions, in conjunction with a minimum of additional circuitry, so as to allow the display of television signals.

In a broad sense, the present invention embodies a display apparatus for receiving a picture signal having video and first and second synchronizing components having respective second frequencies. The display apparatus includes a matrix of display cells arranged in an array having a plurality of columns and at least one row. The display cells are individually addressable by column signals so as to receive the video component of the picture signal in response thereto. A first pointer circuit is coupled to the matrix of display cells and provides the column signals in response to a first clocking signal, and provides a first column pointer signal. A gate circuit is coupled to the first pointer circuit and receives the first and second synchronizing components of the picture signal. The gate circuit passes the first synchronizing component and a selected portion of the second synchronizing component in response to the first column pointer signal. A phase locked loop circuit coupled to the first shift circuit receives the first synchronizing component and the selected portion of the second synchronizing component, and produces the first clocking signal to the first pointer circuit in response thereto.

The present invention also embodies a display apparatus for receiving a picture signal having a plurality of lines, each line having a video component and a first synchronizing component during a first period or a second synchronizing component during a second period. The first and second synchronizing components have respective first and second frequencies, where the second frequency is substantially twice the first frequency.

The display apparatus includes a semiconductor substrate and a matrix of display cells formed on the semiconductor substrate. The matrix of display cells are arranged in an array having a plurality of columns and at least one row, the display cells being individually addressable by column signals so as to receive the video component of the picture signal during the second period in response thereto. A first pointer circuit is formed on the semiconductor substrate and is coupled to the matrix of display cells. The first pointer circuit provides the column signals in response to a first clocking signal. A processing circuit is also formed on the semiconductor substrate, and is coupled to the first pointer circuit. The processing circuit receives the first and second synchronizing components of the picture signal and passes the first synchronizing component during the first period and passes selected portions of the second synchronizing component during the second period. The processing circuit provides the first clocking signal to the first pointer circuit in response to one of the first synchronizing component and the selected portion of the second synchronizing component.

More particularly, the present invention embodies a display apparatus for receiving a television signal having a plurality of lines, each line having a video component and first and second synchronizing components, the first and second synchronizing components having respective first and second frequencies, where the second frequency is substantially twice the first frequency. The display apparatus includes a semiconductor substrate and a matrix of field emission display cells formed on the semiconductor substrate. The matrix of field emission display cells are arranged in an array of M columns by N rows. The field emission display cells are individually addressable by M number of column signals and N number of row signals to selectively receive the video component of the television signals in response thereto.

First and second pointer circuits are formed on the semiconductor substrate and are coupled to the matrix of field emission display cells. The first pointer circuit sequentially provides the M column signals in response to a first clocking signal, and the second pointer circuit sequentially provides the N row signals in response to a second clocking signal. A gate circuit is formed on the semiconductor substrate and is coupled to the first and second pointer circuits. The gate circuit receives the first and second synchronizing components of the television signal and passes the first synchronizing component and a selected portion of the second synchronizing component in response to a first column signal. A phase locked loop circuit is also formed on the semiconductor substrate and is coupled to the first pointer circuit. The phase locked loop circuit receives the first synchronizing component and the selected portion of the second synchronizing component and producing the first clocking signal to the first pointer circuit in response thereto.

The present invention also embodies a method of displaying information based on a picture signal having a plurality of lines. Each line has a video component and a first synchronizing component during a first period and a second synchronizing component during a second period. The first and second synchronizing components have respective first and second frequencies, where the second frequency is substantially twice the first frequency.

The method includes the steps of: (i) providing a matrix of display cells arranged in an array of a plurality of coitus and at least one row, the display cells being individually addressable by column signals so as to receive the video component of the picture signal in response thereto; (ii) receiving the video component of the first synchronizing component during the first period; (iii) passing the first synchronizing component during the first period at a rate equal to the first frequency; (iv) receiving the second synchronizing component during the second period; (v) passing a portion of the second synchronizing component during the second period at a rate equal to the first frequency; (vi) producing a first clocking signal based on the passed first synchronizing component and the passed portion of the second synchronizing component; (vii) providing the video signal to the matrix of display cells; and (viii) producing the column signals at a rate equal to the second clocking signal to sequentially enable display cells in the row to display information based on the video signal.

The present invention solves problems inherent in the prior art by providing a horizontal sync detection system capable of being efficiently monolithically integrated with a scanned matrix display, preferably a field emission display ("FED"). Various features and advantages of the present invention will become apparent to those skilled in the art from studying the following detailed description of the presently preferred embodiments, together with the following drawings.

DETAILED DESCRIPTION OF THE PRESENTLY PREFERRED EMBODIMENTS

Figure 1:
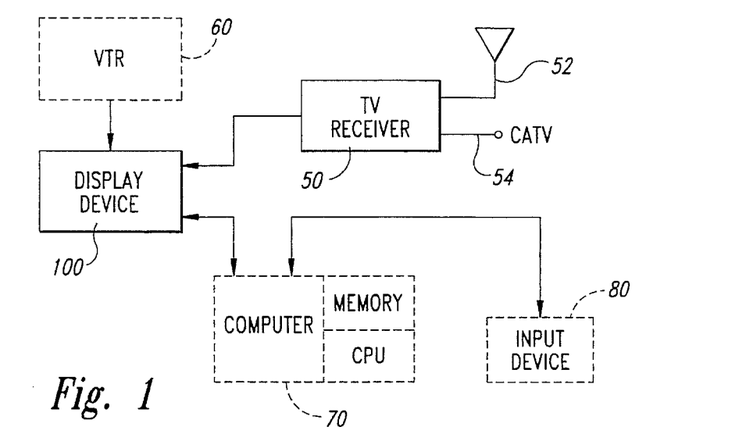
FIG. 1 is a block diagram of exemplary systems employing a display device of the present invention.

Referring to FIG. 1, a scanned matrix display device 100 of the present invention is adaptable for providing visual information in various display systems, for example, in a television when coupled to a television receiver 50. The television receiver 50 receives a standard television or picture signal, such as an NTSC, PAL, SECAM, or other typically broadcast television signal by means of an antenna 52. Alternatively, the television receiver 50 can receive the standard television or a cable television signal by means of a cable 54.

Alternatively, the display device 100 can be employed in a view finder of a video camera (not shown). The display device can also receive a picture signal from a videotape recorder ("VTR") 60. The display device 100 of the present invention can also be coupled to a computer 70 having a memory, a microcontroller or central processing unit ("CPU") and an input device 80 (such as a keypad or keyboard). The display device 100 can be incorporated into a user wearable head-mounted device ("HMD") that is coupled to the television receiver 50, videotape recorder 60 or computer 70. The display systems into which the display device 100 is incorporated can also include additional circuitry and features, not described herein, such as audio receivers and speakers, or frames for removably mounting the display device in front of a viewer's eyes as in an HMD.

Figure 2:
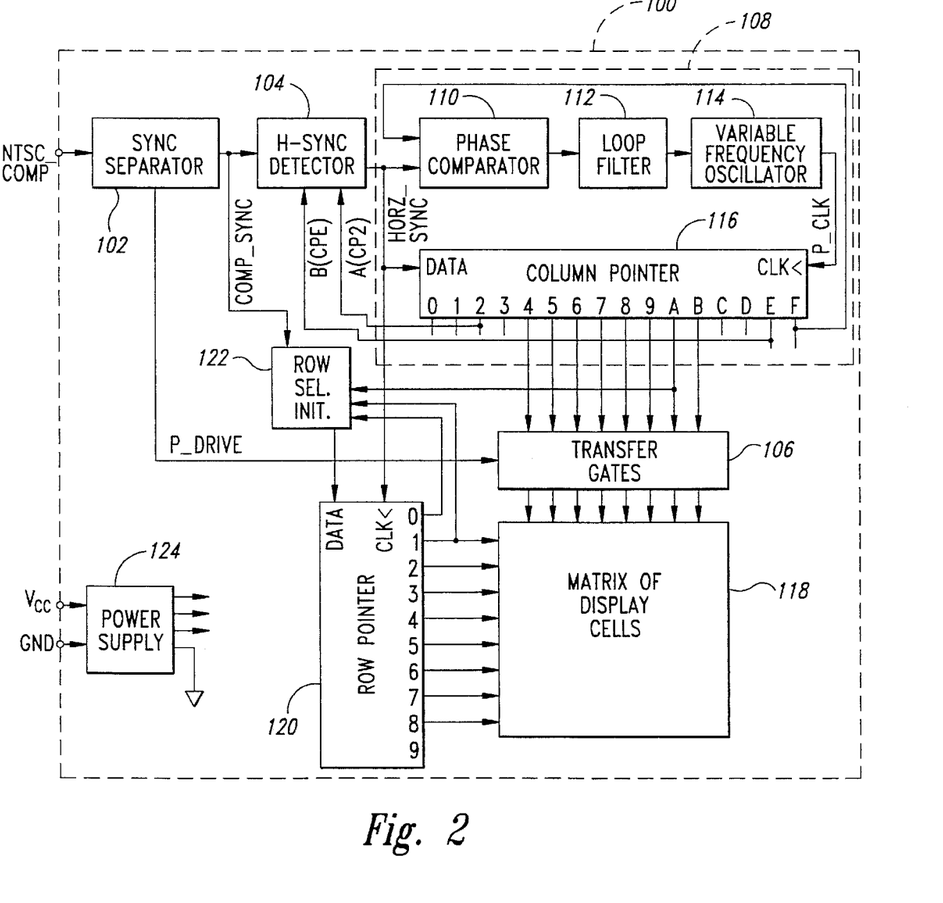
FIG. 2 is a block diagram of the display device of FIG. 1.

The display device 100 is preferably monolithically integrated with various circuitry, as shown in FIG. 2. A sync separator 102 receives a composite video/sync signal such as an NTSC signal ("NTSC_COMP"). The sync separator 102 strips the composite sync information ("COMP_SYNC") from the video information or analog drive signal ("P_DRIVE") in the NTSC composite signal. The display device 100 is generally described herein as a monochrome display, and therefore, the analog drive signal P_DRIVE provides only luminance information such as brightness, intensity and contrast for each picture element in the display device, as described below. However, for display of a color picture, the sync separator 102 can instead be replaced by a color sync separator with RGB decoder that provides the P_DRIVE signal having both luminance and chrominance information for each picture element.

A horizontal sync detector 104 receives the composite sync signal COMP_SYNC, while a transfer gate circuit 106 receives the analog drive signal P_DRIVE. As explained more fully below, the horizontal sync detector 104 isolates horizontal sync pulses from the composite sync signal COMP_SYNC to generate a well-behaved horizontal sync signal ("HORZ_SYNC") that has a single frequency, and inputs the horizontal sync signal to a phase locked loop circuit 108. The phase locked loop circuit 108 includes a phase comparator 110, a loop filter 112, a variable frequency oscillator 114, and a column pointer 116. The phase comparator 110 compares the horizontal sync signal HORZ_SYNC to a final column pointer signal CPF, as described in more detail below.

Using known circuits and techniques, the phase comparator 110 produces an error signal that is filtered by the loop filter 112 and input to the variable frequency oscillator 114 to generate a clock signal P_CLK. The clock signal P_CLK is input to a clock terminal CLK of the column pointer 116. The column pointer 116 is preferably a shift circuit that shifts a pattern of "high" and "low" states at a rate equal to the clock signal P_CLK and provides column pointer signals in response thereto. To simplify the description, the column pointer 116 of FIG. 2 includes only 16 stages, 0 through 9 and A through F. In response to a single "high" signal or pulse that is shifted through the 16 stages of the column pointer 116, a "walking 1" pattern results whereby column pointer signals CP0 through CPF are output therefrom. Column pointer signals CP4 through CPB, in the simplified block diagram of FIG. 2, are input to the transfer gates 106 and serially switch the analog drive signal P_DRIVE to individual picture elements or display cells along a given row of display cells in a matrix of display cells 118.

A row pointer 120 serially provides row pointer signals to the matrix of display cells 118 to enable a given row in the matrix of display cells. Again, to simplify the description, the row pointer 120 of FIG. 2 includes only ten stages 0–9 that provide row pointer signals RP0–RP9, respectively. In a preferred embodiment, the row pointer 120 provides at least 525 row pointer signals for the NTSC composite signal NTSC_COMP. The horizontal sync detector 104 provides the horizontal sync signal HORZ_SYNC to a clock terminal CLK of the row pointer 120 to provide the rate at which the single "high" signal is shifted through the pointer. The column and row pointers 116 and 120 can be constructed from any of several known circuits, such as shift registers, counter/decoders or charge coupled devices ("CCD").

A row selector initiate circuit 122 provides an input signal to a data terminal of the row pointer 120, while the horizontal sync detector 104 provides an input signal to the data terminal of the column pointer 116, as will be described more fully below. A power supply 124 receives direct current via terminals $V_{cc}$ and GND, and using conventional circuit techniques, provides regulated and current limited DC voltages to circuits in the display device 100.

The matrix of display cells 118 embodies a matrix of M rows by N columns of light-emitting diodes, liquid crystal shutters, electroluminescent devices, or equivalent conventional display cell devices. In a preferred embodiment, the matrix of display cells 118 form a field emission display ("FED") where each display cell includes a tip for field emission toward a phosphorescent target, as is described in U.S. Pat. No. 5,212,426, entitled INTEGRALLY CONTROLLED FIELD EMISSION FLAT DISPLAY DEVICE, and U.S. Pat. No. 5,359,256, entitled REGULATABLE FIELD EMITTER DEVICE AND METHOD OF PRODUCTION THEREOF. The matrix of display cells 118 is preferably an FED because an FED can be currently integrated using semiconductor processing techniques, and therefore, the display device 100 of the present invention can be monolithically integrated as a single chip.

The column pointer 116 typically operates at a faster clock rate than the row pointer 120 because all of the display elements in each row must be selected by the column pointer 116 before the row pointer 120 selects the next row. For example, if the matrix of display cells 118 is an array of 500×500 display cells, and an NTSC composite signal is used to drive the display device 100, then the column pointer 116 would enable all of the display cells along a row in about 53.2 microseconds, while the row pointer would enable every other row in the matrix in about 16,667 microseconds (since the NTSC signal employs interleaved flames). The P_CLK signal provides the rate at which the column pointer 116 enables all of the display cells along a given row, while the horizontal sync signal HORZ_SYNC provides the rate at which the row pointer 120 enables rows in the matrix of display cells 118. The frequency of the horizontal sync signal HORZ_SYNC is equal to the time to enable one row, times the number of rows, while the P_CLK signal is equal to the frequency of the HORZ_SYNC signal times the number of columns in each row. Therefore, if the present invention employs the NTSC composite signal to drive the display device 100, then the P_CLK signal clocking the column pointer 116 is about 500 times faster than the HORZ_SYNC signal clocking the row pointer 120.

The row and column pointers 116 and 120 require two input signals to correctly apply the analog drive signal P_DRIVE to the matrix of display cells 118 so that a synchronized and unscrambled video signal is displayed therefrom. The NTSC composite signal NTSC_COMP conveys video information regarding one pixel at any instant in time in a predetermined scanning order, where pixels for a picture are described in left-to-right column order as horizontal lines and in top-to-bottom row order as frames for the picture. The NTSC composite signal NTSC_COMP provides interleaved frames one after another for rapid flicker-free display of moving pictures. Thus, the display device 100 must maintain synchronization with the NTSC composite signal NTSC_COMP so that the top-left display cell in the matrix of display cells 118 receives the appropriate video information from the NTSC_COMP signal regarding the top-left pixel of the picture to be displayed, and so forth. As explained more fully below, the composite sync signal COMP_SYNC in the NTSC composite signal NTSC_COMP is used to properly synchronize application of the video information in the NTSC_COMP signal to the matrix of display cells 118 so as to produce a coherent picture.

The first required input signal to the row and column pointers 116 and 120 is a "data signal", which is a "high" or logical "1" signal that must be input at the beginning of each horizontal line of video data in the NTSC composite signal NTSC_COMP to the column pointer 116, and at the beginning of each frame of video data to the row pointer 120. The second required input signals, or "clock signals" (P_CLK and HORZ_SYNC), are input to the CLK terminals of the column and row pointers 116 and 120, respectively. The clock signals P_CLK and HORZ_SYNC signals must have an appropriate frequency to shift or step the initial "high" signal through the pointers for each pixel in a line of video for the column pointer 116, and for each line in a frame for the row pointer 120, respectively. If any of these input signals are not synchronized with the NTSC composite signal NTSC_COMP, the matrix of display cells 118 will not produce a coherent video picture. The circuitry in the display device 100 for generating the data and clock input signals for the column and row pointers 116 and 120 will now be described.

Considering first the clock input signal P_CLK for the column pointer 116, the phase locked loop 108 produces the P_CLK signal as having a single frequency that is faster than the horizontal sync in the composite sync signal COMP_SYNC. The phase comparator 110 compares the frequency of the horizontal sync signal HORZ_SYNC to the last column pointer signal CPF to generate a DC output error signal that is an average of or proportional to the phase difference between the frequencies of the two input signals. The phase comparator 110 can include an initial bias circuit that helps bias the phase locked loop 108 toward its locking center frequency (i.e., the frequency of the horizontal sync signal HORZ_SYNC). The loop filter 112 filters any high-frequency components in the DC signal to leave only the average in the error signal. The variable frequency oscillator 114 produces an output frequency signal, the P_CLK signal, that is directly proportional to the error signal, with the phase locked loop 108 overall having high gain. As a result, the phase locked loop 108 produces the output signal P_CLK having a frequency higher than the frequency of the horizontal sync signal HORZ_SYNC but which is in phase with the HORZ_SYNC signal.

While a separate counter can be used to lock the phase locked loop 108, since only one "high" pulse is shifted through the column pointer 116, the last column pointer signal CPF can be used as an input to the phase comparator 110 to provide N column pointer signals for each pulse in the horizontal sync signal HORZ_SYNC, and maintain synchronism with the HORZ_SYNC pulses so that the first display cell in each row receives the first pixel of video information in a line of video. As a result, the column pointer 116 not only provides the pointer signals to the matrix of display cells 118, but also provides a comparison signal to the phase comparator 110. Such a circuit is described in more detail in the inventor's previous U.S. patent application Ser. No. 372,413, filed Jan. 13, 1995, entitled TIMING CONTROL FOR A MATRIXED SCANNED ARRAY.

Considering now the data signal input to the row pointer 120, an understanding of the NTSC composite signal is helpful. Referring to the typical NTSC composite signal NTSC_COMP shown in FIG. 3A, the left-hand side of the NTSC_COMP signal shows the last three horizontal lines of video data from a frame ("horizontal lines"). The last three horizontal lines of the NTSC composite signal NTSC_COMP correspond to the bottom three rows for the matrix of display cells 118, and each of the horizontal lines begins with a horizontal sync pulse 131, 132 or 133. The equivalent of each horizontal line in the NTSC composite signal NTSC_COMP (and in the other waveforms) is indicated by a diagonal hash mark extending through the waveform that marks the end of one horizontal line and the beginning of the next line.

Figures 3A, 3B:
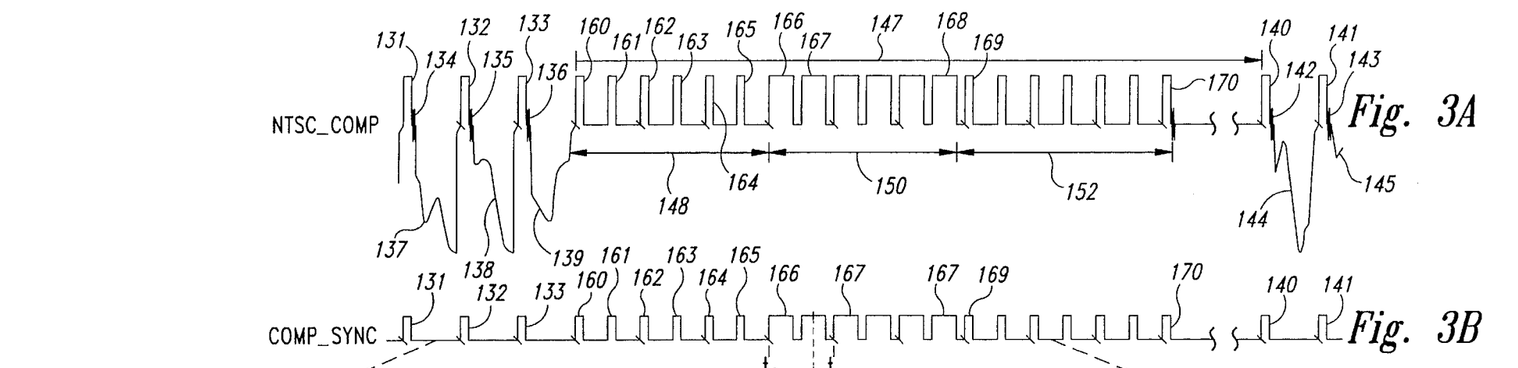
FIG. 3A is a waveform diagram of a typical NTSC composite television signal.
FIG. 3B is a waveform diagram of a composite sync signal derived from the NTSC composite signal of FIG. 3A.

Color bursts 134, 135 and 136 of chrominance information and an analog signal containing luminance information 137, 138 and 139 follow the horizontal sync pulses 131, 132 and 133, all respectively. For a monochrome display, the color bursts 134, 135 and 136 are ignored. The right-hand side of the NTSC composite signal NTSC_COMP shows the top two lines of video for a subsequent frame, having horizontal sync pulses 140 and 141, color bursts 142 and 143, and luminance information 144 and 145, all respectively. Between the end of the last horizontal line of video of one frame and the first horizontal line of video for the subsequent frame, a vertical blanking interval 147 exists consisting of a pre-equalizing pulse interval 148 having pulses 160 through 165, a vertical sync pulse interval 150 having pulses 166 through 168, and a post-equalizing pulse interval 152 having pulses 169 through 170.

As can be seen from the NTSC composite signal NTSC_COMP of FIG. 3A, each horizontal line includes not only the luminance information (e.g., 137, 138 or 139), but also additional information such as the horizontal sync pulses (e.g., 131, 132 or 133), and color bursts (e.g., 134, 135 or 136), equalizing pulses (e.g., 160–165) and vertical sync pulses (e.g., 166–168). The pulses, and sometimes the color bursts, in the NTSC composite signal NTSC_COMP can be considered overhead, since they contain no video information to be scanned into the matrix of display cells 118. Therefore, to compensate for such overhead within horizontal lines in the NTSC composite signal NTSC_COMP, the column pointer 116 includes pre- and post-buffers or additional stages 0–3 and E–F in the column pointer that do not provide column pointer signals to the transfer gates 106. Similarly, to compensate for overhead between horizontal lines in the NTSC composite signal NTSC_COMP, the row pointer 120 includes pre-and post-buffers, or additional stages 0 and 9, that do not provide row pointer signals to the matrix of display cells 118.

The data signal input to the row pointer 120 must have a frequency equal to, or be in sync with, the rate of the frames so that the data signal has a "high" value at the beginning (or end) of each frame of video data. The vertical blanking interval 147 provides such a signal to synchronizing circuitry in standard televisions. Therefore, the vertical blanking interval 147 provides an ideal source from which to generate the data signal for the row pointer 120 in the display device 100.

The vertical blanking interval 147 is at most times high during the vertical sync pulse interval 150, while at most times low during the pre-and post-equalizing pulse intervals 148 and 152. To determine when the vertical sync pulse interval 150 occurs in the NTSC composite signal NTSC_COMP, and thus to determine the end of one frame and the beginning of the next frame, the row select initialization logic 122 examines the composite sync signal COMP_SYNC at a time approximately three-quarters of the way through each horizontal line to determine if it corresponds to a "high" value. Therefore, the column pointer 116 outputs the column pointer signal CPA to the row select initialization logic 122 (FIG. 2) to indicate a time three-quarters of the way through a horizontal line (row) at which the row select initialization logic is to examine the composite sync signal COMP_SYNC and determine if the signal has a "high" value.

The sync separator 102 strips out the horizontal synching pulses (e.g., 131, 132 and 133), and the pulses in the vertical blanking interval 147, to produce the composite sync signal COMP_SYNC as shown in FIG. 3B, and provides the COMP_SYNC signal to the row select initialization logic 122. For example, FIG. 3B shows a horizontal line from time $t_0$ to $t_n$. At a time $t_{3/4}$ three-quarters of the way through the horizontal line, the composite sync signal COMP_SYNC has a "high" value. Therefore, in response thereto, the row select initialization logic 122 inputs a "high" value pulse to the data terminal of the row pointer 120, causing the pointer to begin sequential initialization of rows in the matrix of display cells 118 for a new frame of video.

To ensure that only one "high" value pulse is input to the data terminal of the row pointer 120 during each frame, two or more of the first few stages in the row pointer are coupled to the row select initialization logic 122, as shown by the row pointer signals RP0 and RP1 input to the row select initialization logic. If the row select initialization logic 122 simultaneously detects a "high" value three-quarters of the way through the composite sync signal COMP_SYNC and a "high" value from the first few stages of the row pointer 120, then no additional "high" value pulse is input to the row pointer. Further details on providing synchronized signals for the data terminal of the row pointer 120 are found in the inventor's above-referenced patent application.

Considering now the data input signal to the column pointer 116, and the clock input signals to the CLK input of the row pointer 120, a brief discussion of circuitry described in the inventor's above-described application is helpful. Rather than employing a horizontal sync detector 104, the circuitry described in the above-described application disables the phase comparator 110 during the vertical blanking interval 147 so that the equalization pulses 160–168 did not cause the phase locked loop 108 to lose lock during this interval. Unfortunately, by disabling the phase comparator 110, the circuitry of the above-referenced application potentially causes the phase-lock loop to drift and also loose lock. Additionally, the previous circuitry clocked the row pointer 120 by means of the final column pointer signal CPF, which could cause the row pointer to be out of sync with the NTSC composite signal NTSC_COMP if the phase-lock loop was not locked.

The horizontal sync detector 104 of the present invention detects and passes the rising edge of each horizontal sync pulse in a horizontal line during the active lines of video. During the vertical blanking interval, since the synchronizing pulses occur at a rate of twice the rate of the horizontal sync pulses, the horizontal sync detector 104 detects the rising edge of each of the first equalizing pulse 160 and every other equalizing pulse 161–165, 169–170 and vertical sync pulse 166–168. As a result, the horizontal sync detector 104 produces a single frequency signal, the horizontal sync signal HORZ_SYNC, provided to the phase comparator 110, to which the phase locked loop 108 can lock without disabling the phase locked loop during the vertical blanking interval 147. The horizontal sync detector 104 provides the single frequency horizontal sync signal HORZ_SYNC to the data terminal of the column pointer 116 as a single "high" pulse that is synchronized with the beginning of each horizontal line. Similarly, the horizontal sync detector 104 provides the horizontal sync signal HORZ_SYNC to the clock input of the row pointer 120 as a single "high" pulse that is synchronized with each horizontal row of video in a frame.

Figure 3C:
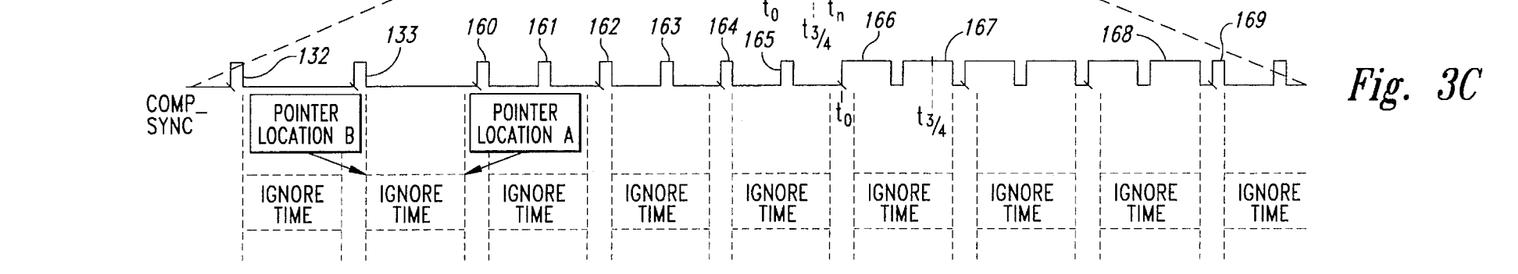
FIG. 3C is an enlarged waveform diagram of a portion of the composite sync signal of FIG. 3B showing periods during which portions of the composite sync signal are ignored by a horizontal sync detector of the display device of FIG. 2.
Figure 3D:
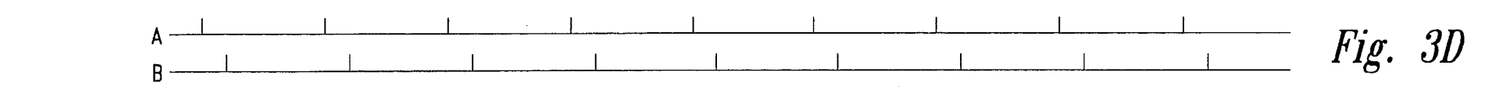
FIG. 3D is a waveform diagram of pointer signals A and B that define the ignored period for the composite sync signal of FIG. 3C.
Figure 3E:
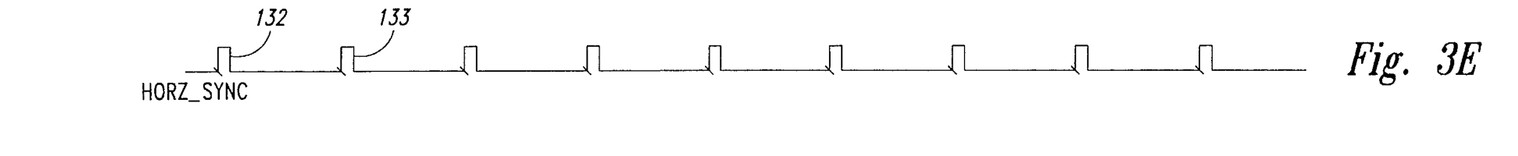
FIG. 3E is a waveform diagram showing a horizontal sync signal produced from the composite sync signal of FIG. 3C by the horizontal sync detector of FIG. 2.

Referring to FIG. 3C, the horizontal sync detector 104 examines the composite sync signal COMP_SYNC during a time interval from the end of one horizontal line to the beginning of a subsequent horizontal line for a horizontal sync pulse, such as the pulse 133, and outputs such a pulse. As shown in FIG. 3D, the column pointer 116 generates a pointer signal A near the end of a horizontal line that causes the horizontal sync detector 104 to begin analyzing the composite sync signal COMP_SYNC for a horizontal sync pulse, and a pointer signal B near the beginning of the next horizontal line that causes the detector to stop looking for the sync pulse. After the pointer signal B, the remainder of the composite sync signal COMP_SYNC during the horizontal line is ignored, and the horizontal sync signal HORZ_SYNC signal is forced low. As a result, the horizontal sync detector 104 passes only about a 10%–20% portion of the composite sync signal COMP_SYNC during each horizontal line. More importantly, when the phase locked loop circuit 108 is in sync with the horizontal sync pulse HORZ_SYNC, the horizontal sync detector 104 passes only the horizontal sync pulses and alternate pulses in the vertical blanking internal 147 in the composite sync signal COMP_SYNC, as shown in FIG. 3E. Additionally, the horizontal sync detector 104 filters any noise in the composite sync signal COMP_SYNC during the time between the pointer signal B until the pointer signal A, thereby avoiding a noise pulse being confused as a horizontal sync pulse.

Referring to FIGS. 4A, 4B, 4C and 4D, the operation of the column pointer 116 in conjunction with the horizontal sync detector 104 is depicted by exemplary waveforms.

Figures 4A, 4B:
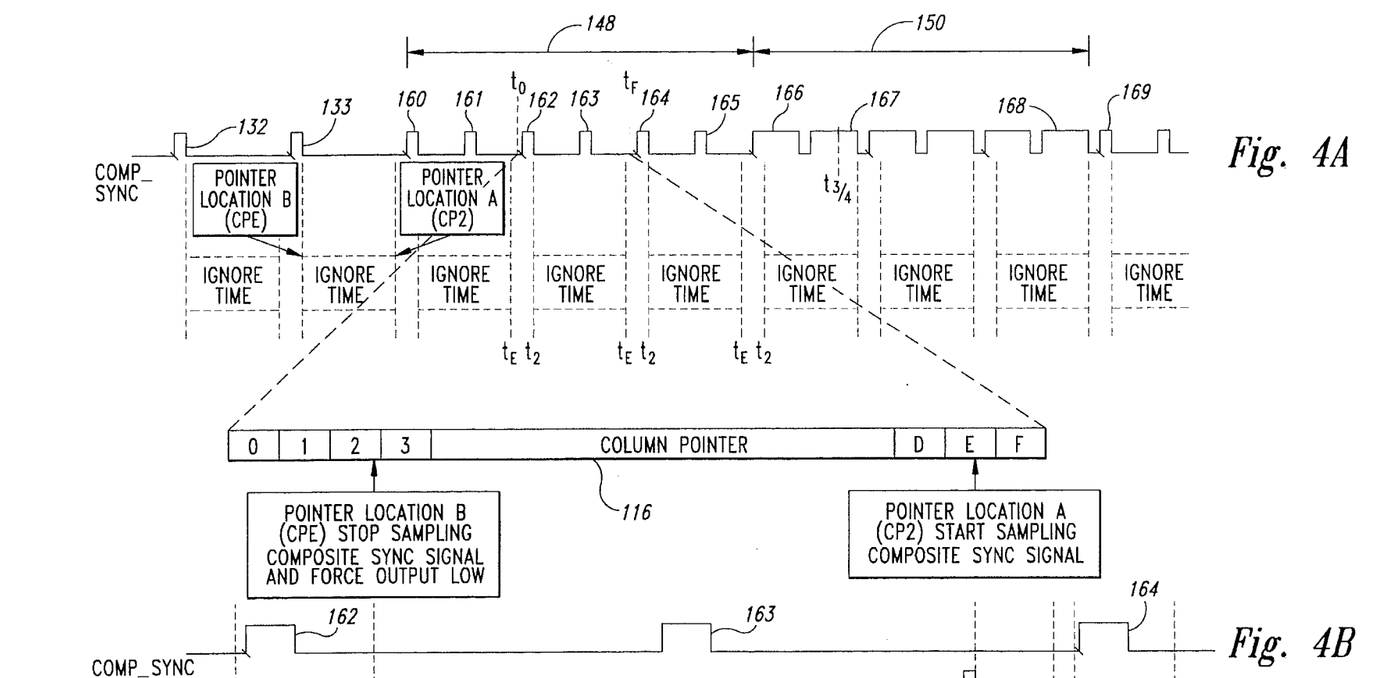
FIG. 4A is an enlarged waveform diagram of the composite sync signal of FIG. 3C, with a block diagram of a column pointer from the display device of FIG. 2, showing how a horizontal line of the composite sync signal corresponds to the storage size of the column pointer.
FIG. 4B is an enlarged waveform diagram of the horizontal line of the composite sync signal of FIG. 4A as it corresponds to the storage size of the column pointer.

Referring to FIG. 4A, the column pointer 116 shifts a "high" value therethrough and thereby sequentially generates column pointer signals CP0 through CPF. At time $t_O$ near the beginning of a horizontal line, the column pointer 116 generates the column pointer signal CP0, while at time $t_F$ at the end of the line, the column pointer generates the column pointer signal CPF. At time $t_2$, the column pointer 116 generates the column pointer signal CP2, which corresponds to the pointer signal B, while at time $t_E$, the column pointer generates the column pointer signal CPE, which corresponds to the column pointer signal A, both of which are input to the horizontal sync detector 104 (FIG. 2).

Figure 4C:
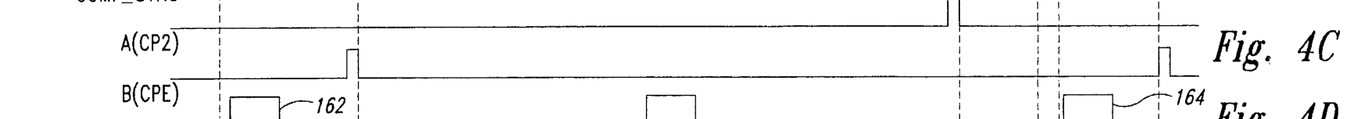
FIG. 4C is a waveform diagram of column pointer signals A and B generated by the column pointer of FIG. 4A.

The column pointer 116 preferably has a length equal to each horizontal line in the NTSC composite signal NTSC_COMP, based on a given clock rate P_CLK for the pointer. Therefore, when the phase locked loop 108 is locked to, and in sync with, the NTSC composite signal NTSC_COMP, the pointer signal A occurs at a predetermined time before the end of a horizontal line, while the pointer signal B occurs at a predetermined time after the start of the next horizontal line. Based on column pointer signals CP2 and CPE, the horizontal sync detector 104 ignores and forces to a "low" value any "high" values in the composite sync signal COMP_SYNC between time $t_2$ and $t_E$ for a horizontal line. Therefore, the horizontal sync detector 104 ignores the equalizing pulse 163 that occurs between pulses defining the column pointer signals CP2 and CPE (FIG. 4c).

The horizontal sync detector 104 passes any "high" value pulses in the composite sync signal COMP_SYNC occurring between $t_E$ and a time near the beginning of the next horizontal line (i.e., a time $t_2'$). Therefore, as shown by comparing the portion of the composite sync signal COMP_SYNC of FIG. 4B with the horizontal sync signal HORZ_SYNC of FIG. 4D, the horizontal sync detector 104 passes the equalizing pulses 162 and 164, but ignores the equalizing pulse 163 frequency signal. As a result, the horizontal sync detector 104 generates the horizontal sync signal HORZ_SYNC as a continuous signal from the composite sync signal COMP_SYNC by passing every horizontal sync pulse, and ignoring every other equalizing pulse in the vertical blanking interval 147.

Figure 4D:
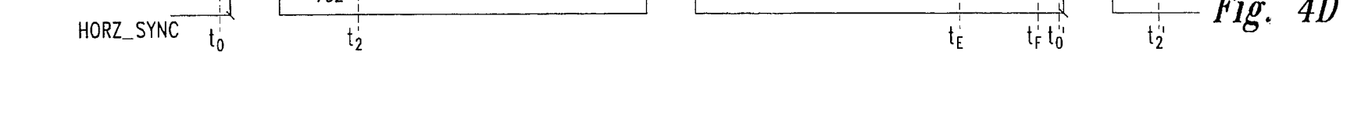
FIG. 4D is an enlarged waveform diagram of the horizontal sync signal of FIG. 3E produced by the horizontal sync detector of FIG. 2.

The resulting horizontal sync signal HORZ_SYNC has a frequency equal to that of the horizontal sync pulses 131, 132, 133, 140 and 141 rate of, and in sync with, the horizontal lines of video. Therefore, the horizontal sync signal HORZ_SYNC can be used as a stable input signal for the phase comparator 110 of the phase locked loop 108. The horizontal sync signal HORZ_SYNC signal can also initiate the column pointer 116 by providing an initial "high" value to the data terminal at the beginning of each horizontal line. Additionally, the HORZ_SYNC signal can be used to clock the row pointer 120 for each horizontal line in the NTSC composite signal NTSC_COMP. Overall, the present invention is able to generate a single frequency signal, based on the NTSC composite signal NTSC_COMP, that can be used to initiate the column pointer 116, to clock the row pointer 120, and to provide a reference signal for the phase locked loop 108, and do so with a minimum amount of additional circuitry to that required for addressing and driving the matrix of display cells 118.

Figure 5:
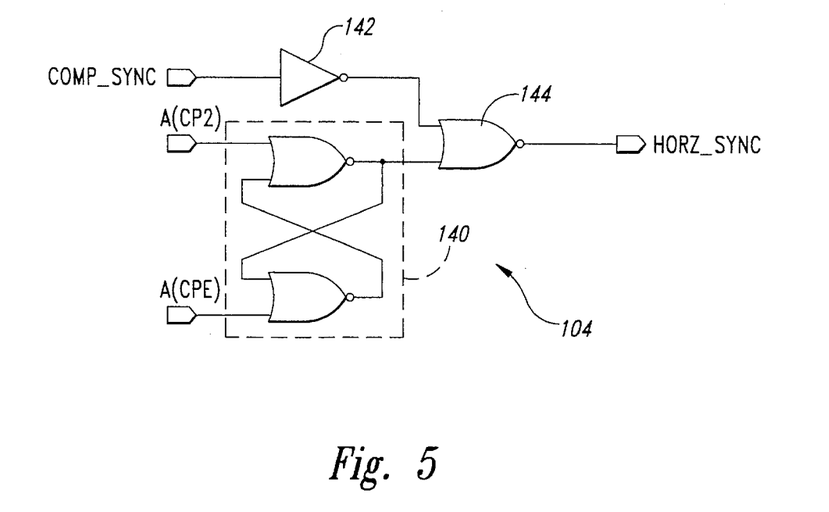
FIG. 5 is a schematic diagram of the horizontal sync detector of FIG. 2.

Referring to FIG. 5, a simple circuit for implementing the horizontal sync detector 104 is shown as employing a flip-flop or resetting latch 140, consisting of NOR gates, which receives the column pointer signals A and B (CP2 and CPE, respectively). The composite sync signal COMP_SYNC is inverted by an inverter 142 and provides a first input to a two input pass gate such as a NOR gate 144. The output of the latch 140 provides the second input to the NOR gate 144. The horizontal sync detector 104 employs inverters and NOR gates because the display device 100 is preferably manufactured using conventional NMOS semiconductor manufacturing techniques. Other logic elements and manufacturing techniques can be substituted to perform the goals of the present invention, as is known by those skilled in the relevant art.

The latch 140 and the NOR gate 144 essentially enable the composite sync signal COMP_SYNC to be passed and output as the horizontal sync signal HORZ_SYNC near the end of a horizontal line, and disables or does not pass the signal near the beginning of the next horizontal line. The pointer signal A enables or sets the latch 140 so that the NOR gate 144 passes the composite sync signal COMP_SYNC, while the pointer signal B disables or resets the latch and thereby causes the NOR gate to not pass the COMP_SYNC signal.

The actual pointer signals from the column pointer 116 that are used as inputs to the latch 140 are selected so that the horizontal sync detector 104 passes only pulses at a frequency equal to that of the horizontal sync pulses. For example, since the column pointer 116 preferably has a length such that the walking one pattern created therethrough occurs over a period of time equal to the time of a horizontal line for a given clock frequency P_CLK, the column pointer preferably provides the pointer signal A at a time 2–3 microseconds from the end of the horizontal line, while the pointer generates the pointer signal B at a time approximately 7–8 microseconds from the beginning of the next horizontal line when the phase locked loop 108 is locked.

At time $t_E$, the column pointer 116 provides the pointer signal A (CP2) as a "high" value to the latch 140, which thereafter, provides a series of zero inputs, to the NOR gate 144. In response to the zero inputs from the latch 140, the NOR gate outputs a zero value until the NOR gate 144 receives the horizontal sync pulse 164 at the beginning of the next horizontal line (at a time $t_0'$). When the composite sync signal COMP_SYNC generates a "high" value before time $t_2$, for example, from the equalization pulse 164, the NOR gate 144 outputs a "high" value as the pulse 164 in the horizontal sync signal HORIZ_SYNC (FIG. 4D).

Thereafter, at the next time $t_2$ (i.e., a time $t_2'$), the column pointer 116 provides the pointer signal B (CP2) as a "high" value to the latch 140, causing the latch to thereafter provide a series of "high" values to the NOR gate 144. The "high" values input to the NOR gate 144 force the horizontal sync signal HORZ_SYNC to a "low" value during the ignore time, until the latch receives the next pointer signal A. Therefore, since one input to the NOR gate 144 is always high during the ignore period, the NOR gate will always output a "low" value despite changes in the value of the other input. Consequently, although the composite sync signal COMP_SYNC provides a "high" value after the pointer signal B (due to the equalization pulse 163), the NOR gate 144 will still output a "low" value.

A shortcoming of the horizontal sync detector 104 of FIG. 5 is that it generally requires the phase locked loop 108 to be locked (assuming the bias circuit in the phase comparator 110 is insufficient to produce a lock). If the phase locked loop 108 is not locked, the horizontal sync pulses 132, 133, etc. could occur during the ignore time, i.e., after pointer location B, but before pointer location A, (FIG. 4A) and the phase lock loop would have difficulty locking to the composite sync signal COMP_SYNC. As a result, a first alternative and improved embodiment to the horizontal sync detector 104 of FIG. 5 is shown as a horizontal sync detector 180 in FIG. 6. The alternative embodiments described herein are similar to the previously described horizontal sync detector 104 of FIG. 5, and all elements are similarly numbered when of similar construction. Only the significant differences in construction or operation are discussed in detail.

Figure 6:
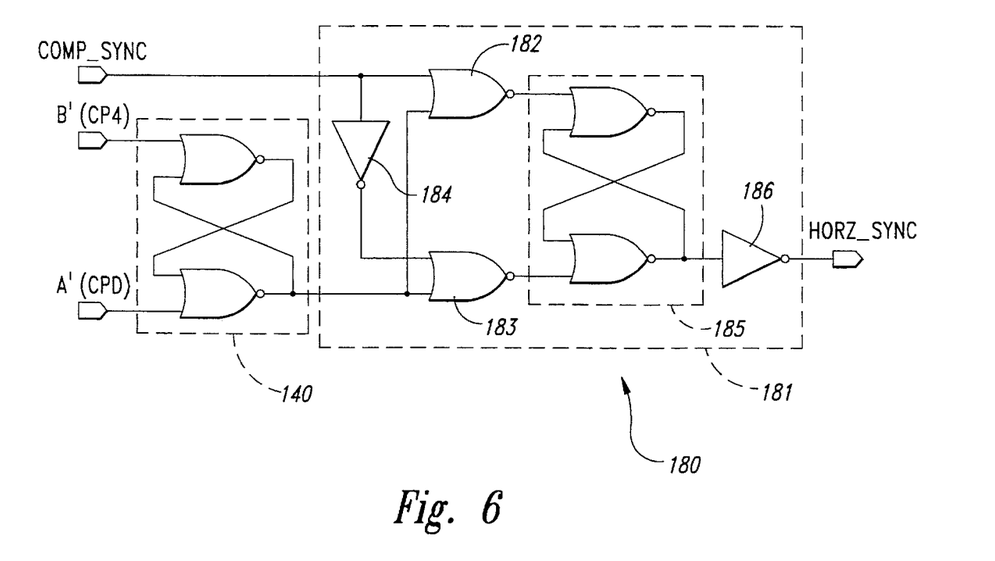
FIG. 6 is a schematic diagram of a first alternative embodiment of the horizontal sync detector of FIG. 5.

An important difference between the horizontal sync detector 104 of FIG. 5 and the horizontal sync detector 180 of FIG. 6 is that the detector 180 replaces the pass gate for NOR gate 144 with a D flip-flop 181 (that has an inverting enable input). As is known to those skilled in the art, a D flip-flop allows its "Q" output to follow its "D" input when an enable signal is applied, but which maintains the output at its previously enabled value when the enable signal is not applied. As a result, unlike the horizontal sync detector 104 of FIG. 5, the horizontal sync detector 180 of FIG. 6 does not force its output (i.e., the horizontal sync signal HORZ_SYNC) to a "low" value during the ignore time. As shown in FIG. 6, the D flip-flop 181 includes a first NOR gate 182 that receives the composite sync signal COMP_SYNC and the output from the latch 140, and a second NOR gate 183 that receives the inverted composite sync signal COMP_SYNC, inverted by an inverter 184, and the output from the latch 140. Outputs from the NOR gates 182 and 183 are input to a latch 185, whose output is inverted by an inverter 186 to provide the horizontal sync signal HORZ$_{13}$ SYNC.

In operation, after the latch 140 receives the pointer signal A' (discussed below), the flip-flop 181 passes the composite sync signal COMP_SYNC as the horizontal sync signal HORZ_SYNC. After the latch 140 receives the pointer signal B' (discussed below), the flip-flop 181, rather than forcing the output of the horizontal sync detector to a "low" value, instead holds the output at the value previously stored in the latch 185. As a result, during the ignore time between the pointer signal B' and the pointer signal A', the horizontal sync signal HORZ_SYNC maintains the value ("high" or "low") that it had before going into the ignore time. Therefore, before the phase locked loop 108 locks, the flip-flop 181 can output a "high" value during the ignore time, and thus allow the phase lock loop to lock to the composite sync signal COMP_SYNC.

To help the phase locked loop 108 to lock, the horizontal sync detector 180 employs preselected column pointer signals A' and B' that differ from the above-described pointer signals A and B. Therefore, an additional important difference between the horizontal sync detector 104 of FIG. 5 and the horizontal sync detector 180 of FIG. 6, is that the latch 140 receives column pointer signals A' and B' that are selected to preferably allow greater than 50% of a horizontal line in the composite sync signal COMP_SYNC to be provided as the horizontal sync signal HORZ_SYNC. Referring to the exemplary column pointer 116 of FIG. 2, pointer signal A' corresponds to column pointer signal CPA, while pointer signal B' corresponds to column pointer signal CP5. As a result, when the phase locked loop 108 is locked to and in sync with the NTSC composite signal NTSC_COMP, the column pointer signal A' occurs at a predetermined time greater than the predetermined time of the pointer signal A from the end of the horizontal line. Similarly, the pointer signal B' occurs at a predetermined time after the predetermined time of the pointer signal B from the start of the next horizontal line.

More importantly, when the phase locked loop 108 is not locked to the NTSC composite signal NTSC_COMP, the horizontal sync detector 180 of FIG. 6 allows greater than 50% of the composite sync signal COMP_SYNC to be provided as the horizontal sync signal HORZ_SYNC to the phase locked loop. Consequently, the phase locked loop 108 has a better likelihood of receiving rising edges of the composite sync signal COMP_SYNC during each horizontal line, but before lock, with the horizontal sync detector 180 than with the horizontal sync detector 104. Therefore, the horizontal sync detector 180 allows the phase comparator 110 to generate an appropriate error signal during each horizontal line (rather than, for example, detecting an edge every several horizontal lines). Consequently, the horizontal sync detector 180 allows the phase locked loop 108 to lock to the incoming composite sync signal COMP_SYNC.

Once the phase locked loop 108 is locked, the horizontal sync detector 180 of FIG. 6 enables portions of the composite sync signal COMP_SYNC to be passed near the beginning of a horizontal line as the horizontal sync signal HORZ_SYNC and disables or does not pass the signal near the beginning of the next horizontal line, as with the horizontal sync detector 104 of FIG. 5. As a result, the horizontal sync detector 180 passes the horizontal sync pulses 131, 132, 133, etc. during the active lines of video, and passes the first of each pair of equalizing pulses or vertical sync pulses occurring during each horizontal line in the vertical blanking interval 147. The phase comparator 110 thereby receives a well-behaved horizontal sync signal HORZ_SYNC that has a single frequency.

When the phase locked loop 108 is not locked, it could produce two "high" value pulses to the data terminal of the column pointer 116 during a given horizontal line. As a result, the display device 100 of the present invention can employ an N input NOR gate that receives all of the column pointer signal outputs from the column pointer 116 and produces a single "high" value pulse to the data terminal when all such outputs have a "low" value. Such a circuit is described in more detail in the inventor's above-described patent application.

A shortcoming of the horizontal sync detector 180 of FIG. 6 is that while it preferably passes greater than 50% of the composite signal COMP_SYNC (because of the pointer signals A' and B'), the detector filters less noise in the COMP_SYNC signal. As a result, the phase comparator 110 could receive a false horizontal sync pulse. Therefore, referring to FIG. 7, a second alternative and improved embodiment to the horizontal sync detector 104 of FIG. 5 is shown as a horizontal sync detector 204.

Figure 7:
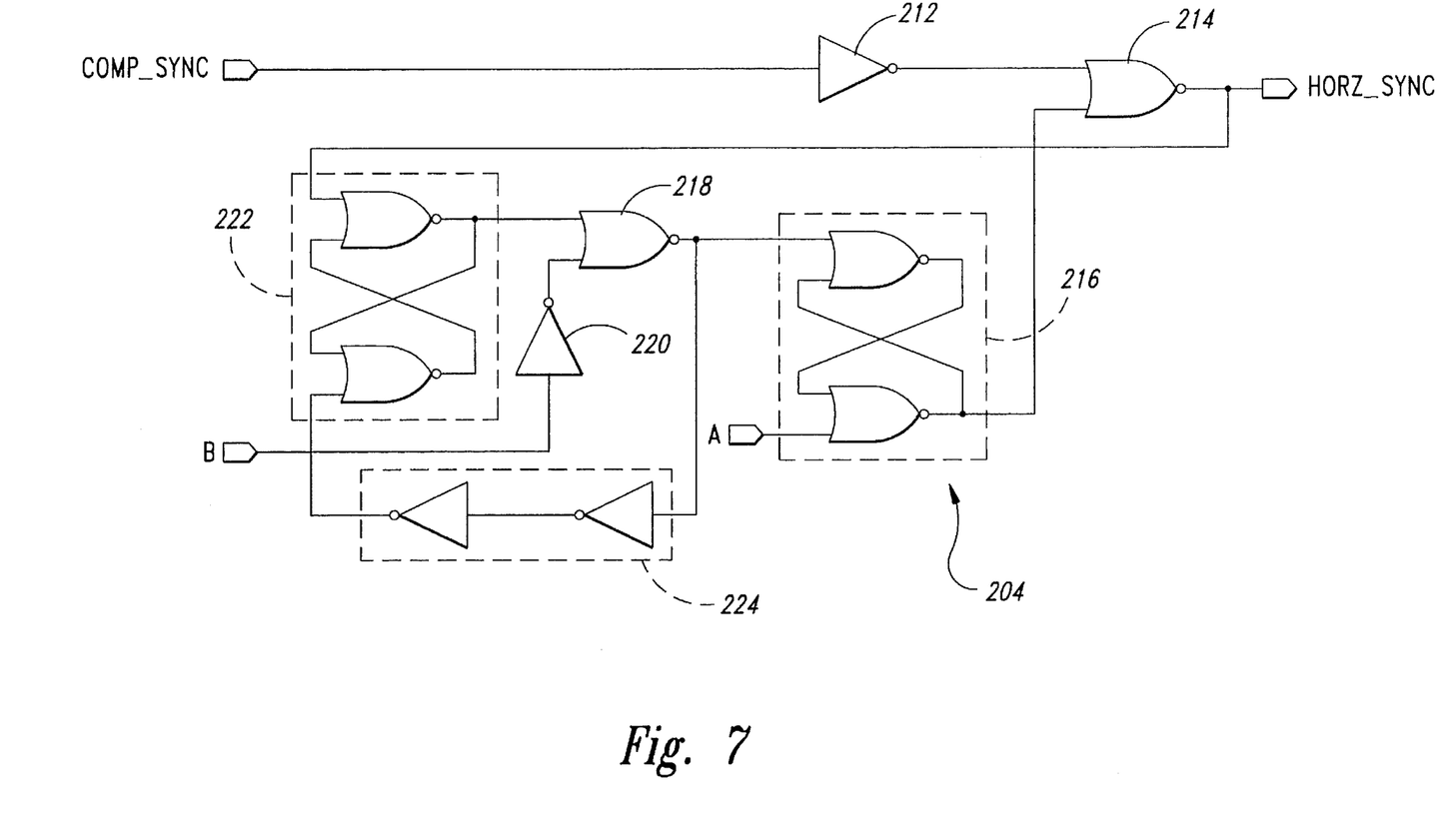
FIG. 7 is a schematic diagram of a second alternative embodiment of the horizontal sync detector of FIG. 5.

The horizontal sync detector 204 employs two latches, 216 and 222, a delay element 224 and a pass gate or NOR gate 218 that allow the horizontal sync detector 204 to shorten the ignore time if the composite sync signal COMP_SYNC has not provided a horizontal sync pulse (or generally, a rising edge) within the time interval defined by the pointer signals A and B. If the horizontal sync detector 204 has not sensed the rising edge of a horizontal sync pulse (or other pulse), then the detector does not force the composite sync signal COMP_SYNC to a low state after the input of the pointer signal B. As a result, the phase comparator 110 of the phase locked loop 108 can look for and received rising edges of the composite sync signal COMP_SYNC, and thus generate an error signal, even though the loop has not yet locked. Consequently, the horizontal sync detector 204 allows the phase locked loop 108 to generate a greater error signal and produce a faster lock than the horizontal sync detector 104 of FIG. 5.

The NOR gate 144 of the horizontal sync detector 204 receives the inverted composite sync signal COMP_SYNC to its first input and the output from the latch 216 as its second input. One input to the latch 216 is the column pointer A (e.g., CPE), while the NOR gate 218 provides the second input to the latch. The column pointer signal B (CPE) is inverted by an inverter 220 and provides a first input of the NOR gate 218, while the second latch 222 provides the second input to the NOR gate. The horizontal sync signal HORZ_SYNC from the NOR gate 144 provides a first input to the latch 222, while the output from the NOR gate 218, delayed by the delay element 224, provides a second input to the latch as a previous value from the NOR gate 218.

In operation, if the NOR gate 102 fails to receive a "high" value pulse in the composite sync signal COMP_SYNC prior to the time $t_2$ (FIG. 4B), the NOR gate outputs a "low" value to the latch 222. As a result, the NOR gate 218 outputs a "low" value to the latch 216, which in turn continues to output "low" values to the NOR gate 144. When the composite sync signal COMP_SYNC finally produces a "high" pulse value from the pulse 162' (which is inverted to a "low" value by the inverter 142), the NOR gate 144 outputs a "high" value as the pulse 162' in the horizontal sync signal HORZ_SYNC, as shown in FIG. 4D. In this way, the horizontal sync detector 204 of FIG. 7 passes a "high" value pulse or rising edge after receiving the pointer signal B, and thereafter resets so as to enter into the ignore period until receiving the next pointer signal A.

In this way, the horizontal sync detector 204 allows the phase locked loop 108 to receive a "high" value pulse after receiving the pointer signal B, produce an error signal, and quickly lock to the COMP_SYNC signal. Once the phase locked loop 108 is locked, the horizontal sync detector 204 enables portions of the composite sync signal COMP_SYNC to be passed near the beginning of the horizontal line as the horizontal sync signal HORZ_SYNC, and disables or does not pass the COMP_SYNC signal near the beginning of the next horizontal line, as with the horizontal sync detector 104 of FIG. 5. As a result, the horizontal sync detector 204 passes the horizontal sync pulses 131, 132, 133, etc. during the active lines of video, and passes the first of each pair of equalizing pulses or vertical sync pulses occurring during each horizontal line and the vertical blanking interval 147. The phase comparator 110 thereby receives a well-behaved horizontal sync signal HORZ_SYNC that has a single frequency.

As can be understood from the above description, the present invention generates a continuous, single frequency horizontal sync signal HORZ_SYNC based on the composite sync signal COMP_SYNC using a minimum of additional circuitry, in part, because the column pointer 116 provides the set and reset signals for the horizontal sync detector 104. As a result, the column pointer 116 provides several functions on the display device 100, namely, pointer signals A and B for the horizontal sync detector 104, a comparison signal (column pointer signal CPF) for the phase comparator 110, and a timing signal (column pointer CPA) for the row select initialization logic 122.

U.S. patents and/or applications cited above are hereby incorporated by reference herein as if set forth in their entirety.

While the detailed description above has been expressed, in part, in terms of specific examples, those skilled in the art will appreciate that many other variations could be used to accomplish the purpose of the disclosed invention. Those skilled in the art will recognize that the present invention is usable in numerous applications requiring visual displays, and particularly with field emission displays (FEDs).

Accordingly, it can be appreciated that various equivalent modifications of the above-described embodiments may be made without departing from the spirit and scope of the invention. Therefore, the present invention is limited only by the following claims.

I claim:

1. A display apparatus for receiving a picture signal having a video component and first and second synchronizing components having respective first and second frequencies comprising:

a matrix of display cells arranged in an array having a plurality of columns and at least one row, the display cells being individually addressable by column signals so as to receive the video component of the picture signal in response thereto;

a first pointer circuit coupled to the matrix of display cells, the first pointer circuit providing the column signals in response to a first clocking signal, including a first pointer signal;

a gate circuit coupled to the first pointer circuit, the gate circuit receiving the first and second synchronizing components of the picture signal and passing the first synchronizing component and a selected portion of the second synchronizing component in response to the first pointer signal; and a phase locked loop circuit coupled to the first pointer circuit, the phase locked loop circuit receiving the first synchronizing component and the selected portion of the second synchronizing component and producing the first clocking signal to the first pointer circuit in response thereto.

2. The display apparatus of claim 1, further comprising a second pointer circuit coupled to the matrix of display cells that provides row signals in response to a second clocking signal, wherein the matrix of display cells includes a plurality of rows of display cells, wherein the first pointer circuit provides a second pointer signal to the gate circuit, and wherein the gate circuit provides the first synchronizing component and the selected portion of the second synchronizing component to the phase locked loop and the second pointer circuit by passing the picture signal to the second pointer circuit and the phase locked loop after receiving the first pointer signal and inhibiting the passing of the picture signal after receiving the second pointer signal, the first synchronizing component and the selected portion of the second synchronizing component being the second clocking signal for the second pointer circuit.

3. The display apparatus of claim 2 wherein the gate circuit includes a latch and a pass gate, the latch being coupled to the first pointer circuit, receiving the first and second pointer signals and producing enable and disable signals in response thereto, respectively, and the pass gate being coupled to the latch and receiving the picture signal and the enable and disable signals and providing the first synchronizing component and the selected portion of the second synchronizing component to the phase locked loop and the second pointer circuit in response to the enable signal.

4. The display apparatus of claim 2 wherein the gate circuit includes a first latch and a flip-flop, the first latch being coupled to the first pointer circuit, receiving a first and second pointer signals, and producing enable and disable signals in response thereto, respectively, and the flip-flop being coupled to the first latch and receiving the picture signal and the enable and disable signals and providing the first synchronizing component and the selected portion of the second synchronizing component to the phase locked loop and the second pointer circuit in response to the enable signal.

5. The display apparatus of claim 4 wherein the flip-flop includes a second latch and first and second pass gates, the first pass gate being coupled to the first latch and receiving the picture signal and the enable and disable signals and providing a first signal to a first input of the second latch, the second pass gate receiving the picture signal and being coupled to the first latch to receive the enable and disable signals and providing a second signal to a second input of the second latch, and the second latch providing the first synchronizing component and the selected portion of the second synchronizing component to the phase locked loop and the second pointer circuit as the second clocking signal in response to the enable signal.

6. The display apparatus of claim 2 wherein the gate circuit includes a delay element, first and second latches and first and second pass gates, the delay element being coupled between an output of the first pass gate and a first input of the first latch, a second input of the first latch being coupled to an output of the second pass gate, a first input of the first pass gate being coupled to an output of the first latch, a second input of the first pass gate coupled to the first pointer circuit and receiving the second pointer signal, a first input of the second latch coupled to the output of the first pass gate and a second input of the second latch being coupled to the second pointer circuit and receiving the first pointer signal, and the second latch producing an enable signal, a first input of the second pass gate coupled to an output of the second latch and receiving the enable signal, and a second input of the second pass gate receiving the picture signal and providing the first synchronizing component and the selected portion of the second synchronizing component to the phase locked loop and the second pointer circuit as the second clocking signal in response to the enable signal.

7. The display apparatus of claim 1 wherein the matrix of display cells is a field emission display.

8. The display apparatus of claim 1 wherein the matrix of display cells, the first pointer circuit, the gate circuit and the phase locked loop are monolithically integrated.

9. The display apparatus of claim 1 wherein the first pointer circuit provides a last pointer signal, and wherein the phase locked loop comprises:

an oscillator coupled to the first pointer circuit provides the first clock signal in response to an error signal; and a comparator, coupled to the gate circuit and the first pointer circuit, that compares the first synchronizing component to the last pointer signal to produce the error signal.

10. The display apparatus of claim 1 wherein the first pointer circuit includes a data terminal that receives a data signal and serially shifts the data signal therethrough to provide the column signals in response thereto, and wherein the gate circuit is coupled to the data terminal of the first pointer circuit and provides the first synchronizing component and the selected portion of the second synchronizing component thereto as the data signal.

11. The display apparatus of claim 1, further comprising a sync separator circuit receiving the picture signal and coupled to the gate circuit and the matrix of display cells, which separates the first and second synchronizing components from the video component in the picture signal, and wherein the first pointer circuit is a shift register.

12. The display apparatus of claim 1 wherein the picture signal is an NTSC signal having a plurality of horizontal lines each having either the video component and a horizontal sync component as the first synchronizing component, or a vertical sync component as the second synchronizing component, the second frequency of the vertical sync component having components that are substantially twice the first frequency of the horizontal sync component, wherein the first pointer circuit provides the first and a second pointer signals to the gate circuit at a rate approximately equal to the first frequency and during each horizontal line, and wherein the gate circuit provides the first synchronizing component and the selected portion of the second synchronizing component to the phase locked loop, the gate circuit passing the picture signal after receiving the first pointer signal, and inhibiting the passing of the picture signal after receiving the second pointer signal, to thereby pass the horizontal synchronizing component and alternate portions of the vertical sync component at the first frequency.

13. A display apparatus for receiving a television signal having a plurality of lines, each line having a video component and a first synchronizing component during a first period or a second synchronizing component during a second period, the first and second synchronizing components having respective first and second frequencies, the second frequency being substantially twice the first frequency, the display apparatus comprising:

a semiconductor substrate;

a matrix of field emission display cells formed on the semiconductor substrate arranged in an array of M columns by N rows, the field emission display cells being individually addressable by M number of column signals and N number of row signals to selectively receive the video component of the television signal in response thereto;

a first and second pointer circuits formed on the semiconductor substrate and coupled to the matrix of field emission display cells, the first pointer circuit sequentially providing the M column signals in response to a first clocking signal and the second pointer circuit sequentially providing the N row signals in response to a second clocking signal, the first pointer circuit producing a first pointer signal;

a gate circuit formed on the semiconductor substrate and coupled to the first pointer circuit, the gate circuit receiving the first and second synchronizing components of the television signal and passes the first synchronizing component and a selected portion of the second synchronizing component to produce the second clocking signal in response to the first pointer signal; and a phase locked loop circuit formed on the semiconductor substrate and coupled to the first pointer circuit and the gate circuit detector and receiving the second clocking signal and produces the first clocking signal to the first pointer circuit in response thereto.

14. The display apparatus of claim 13 wherein the first pointer circuit provides a second pointer signal to the gate circuit, and wherein the gate circuit provides the first synchronizing component and the selected portion of the second synchronizing component to the phase locked loop and to the second pointer circuit by passing the television signal to the second pointer circuit and the phase locked loop after receiving the first pointer signal and not passing the television signal after receiving the second pointer signal, the first synchronizing component and the selected portion of the second synchronizing component being the second clocking signal for the second pointer circuit.

15. The display apparatus of claim 13 wherein the gate circuit includes a latch and a pass gate, the latch being coupled to the first pointer circuit, receiving the first and a second pointer signals and producing enable and disable signals in response thereto, respectively, and the pass gate being coupled to the latch and receiving the television signal and the enable and disable signals and providing the first synchronizing component and the selected portion of the second synchronizing component to the phase locked loop and the second pointer circuit in response to the enable signal.

16. The display apparatus of claim 13 wherein the gate circuit includes a first latch and a flip-flop, the first latch being coupled to the first pointer circuit, receiving the first and a second pointer signals, and producing enable and disable signals in response thereto, respectively, and the flip-flop being coupled to the first latch and receiving the television signal and the enable and disable signals and providing the first synchronizing component and the selected portion of the second synchronizing component to the phase locked loop and the second pointer circuit in response to the enable signal.

17. The display apparatus of claim 13 wherein the first pointer circuit includes a data terminal that receives a data signal and serially shifts the data signal therethrough to provide the column signals in response thereto, and wherein the gate circuit is coupled to the data terminal of the first pointer circuit and provides the first synchronizing component and the selected portion of the second synchronizing component thereto as the data signal.

18. The display apparatus of claim 13 wherein the television signal is an NTSC signal having a plurality of horizontal lines each having either the video component and a horizontal sync component as the first synchronizing component, or a vertical sync component as the second synchronizing component, the second frequency of the vertical sync component having components that are substantially twice the first frequency of the horizontal sync component, wherein the first pointer circuit provides the first and a second pointer signals to the gate circuit at a rate approximately equal to the first frequency and during each horizontal line, and wherein the gate circuit provides the first synchronizing component and the selected portion of the second synchronizing component to the phase locked loop and to the second pointer circuit as the second clocking signal, the gate circuit passing the television signal after receiving the first pointer signal, and inhibiting the passing of the television signal after receiving the second pointer signal, to thereby pass the horizontal synchronizing component and alternate portions of the vertical sync component at the first frequency.

19. A television for receiving a picture signal having video and first and second synchronizing components having respective first and second frequencies comprising:

a receiver that receives the picture signal;

a matrix of display cells coupled to the receiver and arranged in an array having a plurality of rows and a plurality of columns, the display cells being individually addressable by row and column signals to receive the video component of the picture signal in response thereto;

a first pointer circuit coupled to the matrix of display cells, the first pointer circuit providing the column signals in response to a first clocking signal, including a first pointer signal;

a second pointer circuit coupled to the matrix of display cells, the second pointer circuit providing the row signals in response to a second clocking signal;

a gate circuit coupled to the first and second pointer circuits, the gate circuit receiving the first and second synchronizing components of the picture signal and passing the first synchronizing component and a selected portion of the second synchronizing component in response to the first pointer signal, the first synchronizing component and the selected portion of the second synchronizing component being the second clocking signal for the second pointer circuit; and a phase locked loop circuit coupled to the first pointer circuit, the phase locked loop receiving the first synchronizing component and the selected portion of the second synchronizing component and produces the first clocking signal to the first pointer circuit in response thereto.

20. A computer for displaying a picture signal having video and first and second synchronizing components having respective first and second frequencies comprising:

a central processing unit that produces the picture signal;

a memory coupled to the central processing unit;

an input device for inputting commands to the central processing unit;

a matrix of display cells coupled to the central processing unit and arranged in an array having a plurality of rows and a plurality of columns, the display cells being individually addressable by row and column signals to receive the video component of the picture signal in response thereto;

a first pointer circuit coupled to the matrix of display cells, the first pointer circuit providing the column signals in response to a first clocking signal, including a first pointer signal;

a second pointer circuit coupled to the matrix of display cells, the second pointer circuit providing the row signals in response to a second clocking signal;

a gate circuit coupled to the first and second pointer circuits, the gate circuit receiving the first and second synchronizing components of the picture signal and passing the first synchronizing component and a selected portion of the second synchronizing component in response to the first pointer signal, the first synchronizing component and the selected portion of the second synchronizing component being the second clocking signal for the second pointer circuit; and a phase locked loop circuit coupled to the first pointer circuit, the phase locked loop receiving the first synchronizing component and the selected portion of the second synchronizing component and produces the first clocking signal to the first pointer circuit in response thereto.

21. A display apparatus for receiving a picture signal having a plurality of lines, each line having either a video component and a first synchronizing component during a first period, or a second synchronizing component during a second period, the first and second synchronizing components having respective first and second frequencies, the second frequency being substantially twice the first frequency, the display apparatus comprising:

a semiconductor substrate;

a matrix of display cells formed on the semiconductor substrate and arranged in an array having a plurality of columns and at least one row, the display cells being individually addressable by column signals so as to receive the video component of the picture signal during the first period in response thereto;

a first pointer circuit formed on the semiconductor substrate and coupled to the matrix of display cells, the first pointer circuit providing the column signals in response to a first clocking signal and providing, a first pointer signal; and a picture signal processing circuit coupled to the first pointer circuit having a gate circuit and a phase locked loop circuit, the gate circuit being coupled to the first pointer circuit and receiving the first and second synchronizing components of the picture signal and passing the first synchronizing component and a selected portion of the second synchronizing component in response to the first pointer signal; and the phase locked loop circuit being coupled to the first pointer circuit, the phase locked loop circuit receiving the first synchronizing component and the selected portion of the second synchronizing component and producing the first clocking signal to the first pointer circuit in response thereto, the gate circuit and the phase locked loop circuit being formed on the semiconductor substrate.

22. The display apparatus of claim 21, further comprising a second pointer circuit coupled to the matrix of display cells that provides row signals in response to a second clocking signal, wherein the matrix of display cells includes a plurality of rows of display cells, wherein the first pointer circuit provides a second pointer signal to the gate circuit, and wherein the gate circuit provides the first synchronizing component and the selected portion of the second synchronizing component to the phase locked loop and the second pointer circuit by passing the picture signal to the second pointer circuit and the phase locked loop after receiving the first pointer signal and not passing the picture signal after receiving the second pointer signal, the first synchronizing component and the selected portion of the second synchronizing component being the second clocking signal for the second pointer circuit.

23. The display apparatus of claim 21 wherein the matrix of display cells is a field emission display, and wherein the first pointer circuit is a shift circuit.

24. A method of displaying information based on a picture signal having a plurality of lines, each line having a video component and a first synchronizing component during a first period or a second synchronizing component during a second period, the first and second synchronizing components having respective first and second frequencies, the second frequency being substantially twice the first frequency, comprising the steps of:

providing a matrix of display cells arranged in an array of a plurality of columns and at least one row, the display cells being individually addressable by column signals so as to receive the video component of the picture signal in response thereto;

receiving the video component and the first synchronizing component during the first period;

passing the first synchronizing component during the first period at a rate equal to the first frequency;

receiving the second synchronizing component during the second period;

passing a portion of the second synchronizing component during the second period at a rate equal to the first frequency;

producing a first clocking signal based on the passed first synchronizing component and the passed portion of the second synchronizing component;

providing the video signal to the matrix of display cells;

producing the column signals at a rate equal to a second clocking signal to sequentially enable display cells in the row to display information based on the video signal;

producing the second clocking signal based on the first clocking signal, the second clocking signal having a frequency greater than a frequency of the first clocking signal; and producing the row signals at a rate equal to the frequency of the first clocking signal to sequentially enable rows of display cells in the matrix of display cells.

25. A method of displaying information based on a picture signal having a plurality of lines, each line having a video component and a first synchronizing component during a first period or a second synchronizing component during a second period, the first and second synchronizing components having respective first and second frequencies, the second frequency being substantially twice the first frequency, comprising the steps of:

providing a matrix of display cells arranged in an array of a plurality of columns and at least one row, the display cells being individually addressable by column signals so as to receive the video component of the picture signal in response thereto;

receiving the video component and the first synchronizing component during the first period;

passing the first synchronizing component during the first period at a rate equal to the first frequency;

receiving the second synchronizing component during the second period;

passing a portion of the second synchronizing component during the second period at a rate equal to the first frequency;

producing a first clocking signal based on the passed first synchronizing component and the passed portion of the second synchronizing component;

providing the video signal to the matrix of display cells;

producing the second clocking signal based on the first clocking signal, the second clocking signal having a frequency greater than a frequency of the first clocking signal;

producing the column signals at a rate equal to the second clocking signal to sequentially enable display cells in the row to display information based on the video signal;

providing first and second pointer signals at a rate approximately equal to the first frequency;

passing a portion of the picture signal as the first clocking signal after receiving the first pointer signal; and inhibiting the passing of the picture signal after receiving the second pointer signal.

26. The method of claim 25, further comprising the step of initiating the step of producing the column signals by providing a data signal at a rate equal to the frequency of the second clocking signal.

* * * * *

UNITED STATES PATENT AND TRADEMARK OFFICE
CERTIFICATE OF CORRECTION

PATENT NO.    :   5,610,667
DATED         :   March 11, 1996
INVENTOR(S)   :   Glen E. Hush     It is certified that error appears in the above identified patent and that said Letters Patent is hereby corrected as shown below:

In column 17, claim 9, line 49, following "circuit" please insert --that--.

Signed and Sealed this

Twelfth Day of August, 1997

Attest:

BRUCE LEHMAN

*Attesting Officer*  *Commissioner of Patents and Trademarks*